United States Patent [19]

Ward

[11] 4,107,031
[45] * Aug. 15, 1978

[54] HYDROCRACKING PROCESS WITH REACTIVATED CATALYST

[75] Inventor: John W. Ward, Yorba Linda, Calif.

[73] Assignee: Union Oil Company of California, Los Angeles, Calif.

[*] Notice: The portion of the term of this patent subsequent to Jan. 11, 1994, has been disclaimed.

[21] Appl. No.: 723,816

[22] Filed: Sep. 16, 1976

[51] Int. Cl.$^2$ .................... C10G 13/02; B01J 29/12
[52] U.S. Cl. ................................ 208/111; 252/412; 252/466 PT
[58] Field of Search ........................................ 208/111

[56] References Cited

U.S. PATENT DOCUMENTS

| 3,644,200 | 2/1972 | Young | 208/120 |
| 3,692,692 | 9/1972 | Ward et al. | 252/412 |
| 3,781,199 | 12/1973 | Ward | 208/89 |
| 3,835,028 | 9/1974 | Ward et al. | 208/111 |
| 3,899,441 | 8/1975 | Hansford | 252/411 R |
| 3,943,051 | 3/1976 | Ward | 208/111 |
| 4,002,575 | 1/1977 | Ward | 252/411 R |
| 4,055,482 | 10/1977 | Robson | 208/111 |

Primary Examiner—Delbert E. Gantz
Assistant Examiner—G. E. Schmitkons
Attorney, Agent, or Firm—Lannas S. Henderson; Richard C. Hartman; Dean Sandford

[57] ABSTRACT

Deactivated Group VIII noble metal-Y zeolite hydrocracking catalysts are reactivated by oxidative combustion to remove coke deposits, followed by treatment with aqueous ammonia to redistribute agglomerated noble metal, followed by calcination in a critical temperature range between about 600° and 850° F. The low-temperature calcination results in reactivated catalysts of improved activity, particularly for hydrocracking feedstocks substantially free of nitrogen compounds.

14 Claims, No Drawings

HYDROCRACKING PROCESS WITH REACTIVATED CATALYST

BACKGROUND AND SUMMARY OF INVENTION

It is known in the art that certain types of hydrocracking catalysts comprising a Group VIII noble metal supported on an acidic Y zeolite base undergo gradual deactivation upon extended use in hydrocracking, which deactivation is attributable in part to coke deposition, and in part to migration and agglomeration of the noble metal component. Coke deactivation is readily reversible by conventional oxidative regeneration, but such regeneration has little if any effect in redispersing the agglomerated noble metal, and may in fact bring about further agglomeration thereof. Recently, as disclosed in U.S. Pat. Nos. 3,692,692, 3,899,441, and 3,943,051, it has been discovered that effective redispersal of agglomerated noble metal on such catalysts can be obtained by treatment with aqueous ammonia solutions. Following the aqueous ammonia treatment, a calcination step is required in order to convert the hydrated ammonium zeolite catalyst to a dehydrated, deammoniated, oxidized form. The temperature utilized in this calcination step form the gist of the present invention.

All previous experience in calcining the original, fresh ammonium form of the present catalysts indicated that temperatures between about 900° and 1100° F were required in order to achieve maximum activity. Based on this experience, each of the aforementioned patents strongly recommends that the ammonia-rejuvenated catalysts also be calcined at temperatures of 900°–1100° F. This premise came into question when it was discovered (as disclosed in my U.S. Pat. No. 4,002,575) that a substantial increase in activity could be obtained by partially rehydrating ammonia-rejuvenated catalysts which had been calcined at 930° F. Based on this experience, it was surmised that a similar increase in activity might be obtained if an equivalent proportion of water were retained in the rejuvenated catalyst by simply calcining at lower temperature. In testing this premise, two rather distinct and surprising discoveries were made, which form the basis of the present invention.

Firstly, it was discovered that for hydrocracking in the presence of more than about 200 ppm by weight of ammoniacal nitrogen, the low-temperature calcined rejuvanated catalysts were at least equivalent in activity to partially rehydrated, high-temperature calcined catalysts of equivalent water content. Secondly, and more surprisingly, it was found that the former type catalyst (of this invention) was significantly more active than the latter for hydrocracking in the presence of less than about 200 ppm of ammoniacal nitrogen. Based on these discoveries, it would appear that the water retained by low temperature calcination following rejuvenation probably occupies more effective active sites in the anionic structure of the zeolite than does an equivalent proportion of water added by rehydration to a high temperature calcined rejuvenated catalyst. The foregoing explanation is however merely theoretical, and is not to be construed as limiting herein.

DETAILED DESCRIPTION

A. Catalyst Compositions

The catalysts of this invention are now well known in the art, and comprise a Y zeolite cracking base having supported thereon about 0.1 – 3 wt.% of one or more Group VIII noble metals, particularly palladium and/or platinum, preferably palladium. The Y zeolite cracking base preferably contains less than about 3 wt.% of $Na_2O$ as a result of extensive ion exchange with ammonium salts to form an ammonium zeolite which is then converted to a corresponding hydrogen zeolite by calcination in conventional fashion.

Preferably, a stabilized form of the hydrogen Y zeolite is utilized. Stabilization can be effected by exchanging about 1–10 wt.% of polyvalent metal ions into the ammonium zeolite, particularly the metals of Groups IIA and IIB, e.g., calcium, magnesium, zinc and the like. The rare earth metals can also be utilized as stabilizing cations. Metal-stabilized catalysts of this nature are more particularly described in U.S. Pat. No. 3,963,644. Another suitable type of stabilized Y zeolite base is one which is essentially free of zeolitic metals, and is prepared by steam stabilization, as described in my U.S. Pat. No. 3,929,672. The Group VIII noble metal hydrogenating component is ordinarily added to the ammonium zeolite base by ion exchange with an aqueous solution of a suitable compound of the desired metal wherein the metal is present in a cationic form, as described for example in U.S. Pat. No. 3,236,762.

When catalysts of the foregoing description are utilized for hydrocracking over extended periods of time at temperatures of e.g., 500°–800° F, a progressive decline in catalyst activity occurs as a result of coke deposition. A concurrent decline in activity, attributable to migration and agglomeration of the noble metal component as a result of adverse conditions of temperature and water vapor partial pressure encountered during hydrocracking and/or during oxidative regeneration of the catalyst may also occur. Deactivation by coking is almost completely reversible by conventional oxidative regeneration at temperatures of e.g., 750°–1100° F. When it is found that such oxidative regeneration restores less than about 90% of the fresh hydrogenation activity of the catalyst, it may be assumed that some undesirable maldistribution of the noble metal component has occurred, such as to warrant use of the aqueous ammonia rejuvenation procedure described herein.

B. Rejuvenation With Aqueous Ammonia

Following conventional oxidation to remove coke deposits, the catalyst is subjected to treatment with aqueous ammonia to effect a redispersal of the noble metal component. This redispersal is believed to proceed through the mechanism of formation of soluble ammino-hydroxide complexes, which are highly basic, and tend to migrate to the strongest acidic sites in the anionic zeolite structure. The contacting with aqueous ammonia may be carried out by either of two general procedures.

Firstly, a vapor phase hydration-ammoniation may be carried out as described in U.S. Pat. No. 3,899,441. In this procedure, the catalyst is simply hydrated in moist air or other wet gas to an extent of about 50–40 wt.%, and the adsorbed aqueous phase is then saturated with gaseous ammonia to an extent of about 10–35 wt.% $NH_3$, based on the weight of the water phase. The catalysts may first be saturated with water, and then ammoniated by passing ammonia or ammonia-containing gases therethrough, or simultaneous hydration and ammoniation can be effected by passing a gas stream containing both ammonia and water vapor through the catalyst bed until both water vapor and ammonia appear in the off-gases.

A second, and in most cases preferred, aqueous ammonia treatment is described in my above noted patent No. 3,943,051, and consists in treating the catalyst with a volumetric excess of liquid ammonium hydroxide solution. The volume of ammonia solution employed is at least sufficient to submerge the catalyst bed, and is preferably between about 2 and 6 volumes per bulk volume of catalyst. The treatment may be carried out by conventional procedures involving contact of the catalyst with the ammonium hydroxide solution in a single stage, in plural batch stages, or continuously by flowing a stream of the ammonia solution through the catalyst bed. The ammonium hydroxide solution may vary in strength over a wide range of about 0.1 – 30 wt.% $NH_3$.

In either of the foregoing contacting procedures, practical contacting temperatures range between about 20° and 100° C, and contact times range between about 30 minutes and 6 hours or more.

The aqueous ammonia treatment may optionally be supplemented with an ion exchange treatment with an aqueous solution of an ammonium salt, which treatment is also described in my above U.S. Pat. No. 3,943,051. This treatment is particularly preferred in the case of catalysts which contain more than about 0.5 wt.% of zeolitic $Na_2O$, or other zeolitic metals. The ion exchange treatment with ammonium salt solution may be performed either before or after, but preferably after, the aqueous ammonia treatment, or may be carried out simultaneously by admixing an ammonium salt into the aqueous ammonia solution.

Following the ammonia rejuvenation, the catalyst is washed free of any soluble salts contained therein, and is then subjected to the special drying and calcining procedure of this invention.

C. Drying and Calcining

The overall objectives of the drying and calcining operation are to convert the hydrated, ammonium zeolite catalyst to a partially dehydrated, deammoniated, oxidized form, without bringing about reagglomeration of the noble metal component. The residual water content of the calcined catalyst should be between about 4–12 wt.%, and the maximum calcining temperature should be between about 600° and 850° F, preferably between about 600° and 750° F.

The foregoing objectives can be achieved with difficulty by a carefully controlled rapid heatup in air to the maximum desired calcination temperature, but to achieve maximum catalytic activity in this manner presents certain problems. At temperatures above about 500° F, the noble metal component, when in an oxidized state, tends to undergo severe agglomeration unless the water vapor partial pressure is carefully controlled. Hence, a rapid heatup in air would tend to raise the catalyst temperature to above 500° F before some portions of the catalyst bed had been sufficiently dehydrated to permit control of localized water vapor concentrations. In general, in order to avoid agglomeration of oxidized metal in the 500°–850° F temperature range, it is preferable to maintain water vapor partial pressures below about 10 psi, and preferably below 2 psi. It is therefore desirable to reduce the adsorbed water content of the catalyst to about 5–12 wt.% at temperatures below 500° F, for at temperatures above 500° F the catalyst is rapidly being converted to an oxidized state with chemical evolution of water. At below about 500° F, the metal or metal oxide is not affected by water vapor.

Accordingly, for the above purposes, a preferred drying step is carried out by first passing a stream of dry air at an initial temperature of 100°–200° F through the bed of catalyst without maintaining dew point control over the effluent gases, and incrementally raise the gas temperature to a level in the 300°–500° F range. The drying is preferably carried out at atmospheric pressures or slightly elevated pressures of e.g., 50–100 psig. The calcination is continued at temperatures gradually increasing from about 500° F to the desired terminal temperature while controlling water concentration in the calcination vessel, as by monitoring the effluent gases to maintain a dew point below about 40° F, preferably below 20° F. Inlet gas temperatures are increased gradually over a period of about 1–10 hours until the desired terminal temperature is reached, following which the terminal temperature is maintained for about 0.5 – 2 hours. The terminal temperature should be correlated with the time during which it is maintained so as to give a final catalyst water content of between about 4 and 12, preferably about 5 and 10, wt.%. Water content is determined as weight loss on ignition (LOI), i.e. weight loss after heating for 2 hours at 1000° C (1832° F).

The gradual heatup procedure as described above is a practical necessity when the calcination is carried out with a deep bed of catalyst through which the calcination gases are passed. It is not intended however that the invention be limited to this procedure, for a considerably more rapid heatup can be utilized when the catalyst is arranged in thin layers through which the gases pass, whereby the effect of water vapor on downstream portions of the catalyst is minimized. Commercially, a rotary kiln equipped with lifters and a dry air sparger to provide good ventilation of the cascading bed of catalyst is very effective.

A particularly critical period during the calcination appears to be the period of burnoff of zeolitic ammonium ions, which occurs primarily at temperatures above about 600° F, and can generate a burning wave in the catalyst bed wherein instantaneous temperatures and water vapor concentrations may inhibit full recovery of the original fresh catalyst activity. Accordingly, greatest care should be exercised to minimize water vapor concentrations at temperatures above about 600° F.

D. Hydrocracking Process Conditions

After activation by reduction with hydrogen at 700°–1000° F, the rejuvenated catalyst may be used for hydrocracking under the following operating conditions:

|  | Broad Range | Preferred Range |
| --- | --- | --- |
| Temp. ° F | 450–850 | 500–750 |
| Pressure, psig | 400–5000 | 800–2000 |
| LHSV | 0.2 – 10 | 0.5 – 5 |
| $H_2$/oil ratio, MSCF/B | 1 – 20 | 3 – 10 |

The above conditions are suitably correlated to effect about 20–80% conversion per pass to products boiling below the initial boiling point of the feed. Run lengths of at least about 6 months are easily achieved under such conditions. Suitable hydrocracking feedstocks include in general any mineral oil fraction boiling above about 300° F, and up to about 1200° F, any of which may be converted to products including gasoline, jet fuel, diesel fuel and the like.

In the case of initial feedstocks which contain more than about 10 ppm of native organic nitrogen, it is preferable that such feedstocks be subjected to catalytic hydrofining before contacting the hydrocracking catalyst. Such hydrofining is carried out under conventional conditions, to reduce the organic nitrogen content of the feed to below about 10 ppm. The ammonia formed during hydrofining may be allowed to pass through the hydrocracking zone, or it may be substantially removed therefrom, as by water washing. Where sufficient ammonia is present in the hydrocracking zone to provide more than about 200 ppm of nitrogen by weight, based on feed, temperatures in the high ranges delineated above should be utilized, and the activity of the rejuvenated catalyst is found to be at least equivalent to the partially rehydrated high-temperature calcined catalysts of my above noted copending application, Ser. No. 604,818. In cases where less than about 200 ppm of ammoniacal ammonia is present in the hydrocracking zone, hydrocracking temperatures between about 500° and 650° are preferably utilized, and under these conditions the rejuvenated catalysts become significantly more active than the rehydrated catalysts of said copending application.

The following Examples are cited to illustrate the invention, but are not to be construed as limiting in scope.

EXAMPLE I

In commercial hydrocracking operations carried out substantially continuously over a period of about 6 years a single batch of catalyst was utilized, said catalyst consisting of 0.5 wt.% Pd supported on a ⅛-inch copelleted composite of 20% $Al_2O_3$ and 80% of a Y zeolite cracking base having a $SiO_2/Al_2O_3$ mole ratio of about 4.7, wherein about 35% of the zeolitic ion exchange capacity was satisfied by magnesium ions (3 wt.% MgO), about 10% by sodium ions, and the remainder (55%) by hydrogen ions. The operations were carried out at pressures of about 1500 psig, with space velocities varying between about 1.3 and 1.7, hydrogen rates varying between 5000 and 7000 SCF/B, and with hydrocracking temperatures varying between about 500° and 720° F. During a portion of the operation, the feedstock was a hydrofined gas oil (400°–850° F boiling range) containing $H_2S$ and $NH_3$ from the hydrofiner, and at other times the feedstock was substantially free of ammonia. Hydrocracking temperatures were adjusted during the various runs to maintain 40–60 volume percent conversion per pass to gasoline.

At the end of the six-year period, a portion of the catalyst was carefully regenerated by oxidative combustion at temperatures ranging from about 700° up to 1000° F, utilizing a regeneration gas comprising oxygen in amounts increasing from about 0.1 to 3.0 volume percent, whereby water vapor partial pressures were maintained at a value below about 0.25 psia at all regeneration temperatures above 500° F.

The regenerated catalyst was then activated in a stream of dry hydrogen at temperatures increasing 50° F per hour to 450° F, holding at 450° F for six hours, then increasing 50° F per hour to 700° F, and holding at 700° F for six hours. The activated catalyst was then tested for activity, compared to that of the fresh catalyst. One feedstock used for the activity test was a substantially nitrogen-free, 400°–850° F gas oil, doped with thiophene to a level of 0.48% sulfur to provide an $H_2S$-containing atmosphere for the hydrocracking. The other feedstock consisted of the same gas oil doped with thiophene and with tertiary butylamine to a level of 0.2% nitrogen to provide an $NH_3$-containing atmosphere for the hydrocracking. Under standard test conditions of pressure, space velocity and hydrogen/oil ratios, activities are expressed in terms of the temperature required to maintain a standard volume-percent conversion to gasoline per pass after 100 hours on stream. The results of the tests were as follows:

Table 1

| | Temp. for 52–54% Conversion, ° F, S-containing Feed | Temp. for 40–42% Conversion, ° F, S & N-containing Feed |
|---|---|---|
| Fresh Catalyst | 563 | 736 |
| Regenerated Catalyst | 615 | 746 |

It will be seen from the above that, for hydrocracking in the presence of ammonia, the catalyst had lost 10° F in activity not attributable to coke deposition, and 52° F in activity for hydrocracking in the absence of nitrogen.

EXAMPLE II

A sample of the catalyst regenerated as described above was treated according to the rejuvenation process of my copending application Ser. No. 604,818, as follows:

(1) Allowed to hydrate at temperatures maintained below 250° F in a flowing stream of steam and nitrogen to saturation;

(2) Treated with gaseous ammonia at ambient temperatures and pressures to substantially saturate the water in the catalyst pores (about 25–30 wt.% $NH_3$ based on water);

(3) Allowed to stand in a closed vessel for 8 hours at ambient temperatures;

(4) Purged with nitrogen at ambient temperature to remove excess ammonia;

(5) Dried and calcined in flowing dry air at temperatures increasing gradually to 450° F, holding at 450° F until the dewpoint of the exiting gases is less than −10° F, and then increasing the temperature gradually to 930° F, and finally holding at 930° for 1 hour. At this stage the loss on ignition (LOI) of the catalyst was 3.3 wt.%, as determined by heating at 1832° F (1000° C) for 2 hours;

(6) Allowed to be partially rehydrated by exposure to laboratory air for about 60 minutes. After this time the catalyst contained 7.6 wt.% volatiles.

Upon activating the catalyst and activity testing as described in Example I, the results were as follows:

Table 2

| | Temp. for 52–54% Conversion, ° F, S-containing Feed | Temp. for 40–42% Conversion, ° F S & N-containing Feed |
|---|---|---|
| Fresh Catalyst | 563 | 736 |
| Rehydrated, Rejuvenated Catalyst | 557 | 718 |

From the foregoing, it will be seen that the rehydrated rejuvenated catalyst was more active than the fresh catalyst. The following examples will show that by low-temperature calcination of the rejuvenated catalyst, equal or superior results are obtained.

EXAMPLES III – VII

Five additional samples of the regenerated catalyst from Example I were rejuvenated as described in steps (1)–(5) of Example II, except that the final calcination temperature in step (5) was varied for each sample, as shown in Table 3. Step (6) was omitted. Upon activity testing as described in Example I, the results were as follows:

Table 3

| Catalyst | Calc. Temp, °F | LOI, wt.-% | Temp. for 52–54% Conversion, °F S-containing Feed | Temp. for 40–42% Conversion, °F S & N-containing Feed |
|---|---|---|---|---|
| Ex. II | 930 (Rehydrated) | 7.6 | 557 | 718 |
| Ex. III | 1000 | 3.6 | 568 | 720 |
| Ex. IV | 930 | 4.3 | 566 | 720 |
| Ex. V | 830 | 4.7 | 556 | 719 |
| Ex. VI | 750 | 5.7 | 555 | 720 |
| Ex. VII | 650 | 5.6 | 549 | 718 |

From the foregoing, it will be apparent that the catalysts of Examples II–VII are essentially equivalent for hydrocracking the S- and N-containing feed. For hydrocracking the N-free feed, the catalysts of Examples III and IV are inferior, the catalysts of Examples V and VI are essentially equivalent, and the catalyst of Example VII is significantly superior, as compared to the rehydrated catalyst of Example II.

The following claims and their obvious equivalents are believed to define the true scope of the invention.

I claim:

1. A hydrocracking process which comprises subjecting a hydrocarbon feedstock plus added hydrogen to contact at hydrocracking conditions of temperature, pressure and space velocity with a catalyst comprising a Group VIII noble metal supported on a stabilized Y zeolite cracking base, said catalyst having been previously utilized for hydrocracking to a point of substantial deactivation, and having thereafter been reactivated by a process which comprises:
   (1) subjecting said deactivated catalyst to oxidative combustion to remove coke deposits therefrom;
   (2) contacting the decoked catalyst from step (1) with aqueous ammonia containing at least 0.1 wt.% NH$_3$ for a sufficient time to effect a redispersal of said Group VIII noble metal; and
   (3) drying and calcining the ammoniated catalyst from step (2) in an oxidizing gas at a maximum temperature of about 600°–850° F, to effect deammoniation of said catalyst and to reduce its water content to between about 4% and 12% by weight, the temperature and water vapor partial pressures during said drying and calcining being controlled for the purpose of preventing reagglomeration of said Group VIII noble metal.

2. A process as defined in claim 1 wherein said maximum temperature in step (3) is between about 600° and 750° C.

3. A process as defined in claim 1 wherein said feedstock is a mineral oil fraction containing less than about 10 ppm of native organic nitrogen.

4. A process as defined in claim 1 wherein step (2) is carried out by vapor phase hydration of said catalyst to about 5–40 wt.% of adsorbed water, said adsorbed water containing about 10–35 wt.% of dissolved NH$_3$.

5. A process as defined in claim 1 wherein step (2) is carried out by contacting said catalyst with at least sufficient of an aqueous ammonium hydroxide solution containing about 0.1–30 wt.% of NH$_3$ to submerge the catalyst bed.

6. A process as defined in claim 1 wherein following step (1) and prior to step (3), said catalyst is subjected to ion exchange by contact with an aqueous ammonium salt solution to remove zeolitic metal cations therefrom.

7. A process as defined in claim 1 wherein said Y zeolite cracking base is stabilized with about 1–10 wt.% of zeolitic polyvalent metal ions.

8. A hydrocracking process which comprises subjecting a hydrocarbon feedstock plus added hydrogen to contact with a catalyst comprising a Group VII noble metal supported on a stabilized Y zeolite cracking base, said contacting being carried out in the presence of less than about 200 ppmw of ammoniacal nitrogen, at a temperature between about 500° and 650° F and at a pressure and space velocity sufficient to give a substantial conversion of said feedstock to lower boiling hydrocarbons, said catalyst having been previously utilized for hydrocracking to a point of substantial deactivation, and having thereafter been reactivated by a process which comprises:
   (1) subjecting said deactivated catalyst to oxidative combustion to remove coke deposits therefrom;
   (2) contacting the decoked catalyst from step (1) with aqueous ammonia containing at least 0.1 wt.% NH$_3$ for a sufficient time to effect a redispersal of said Group VIII noble metal; and
   (3) drying and calcining the ammoniated catalyst from step (2) in an oxidizing gas at a maximum temperature of about 600°–850° F, to effect deammoniation of said catalyst and to reduce its water content to between about 4% and 12% by weight, the temperature and water vapor partial pressures during said drying and calcining being controlled for the purpose of preventing reagglomeration of said Group VIII noble metal.

9. A process as defined in claim 8 wherein said maximum temperature in step (3) is between about 600° and 750° C.

10. A process as defined in claim 8 wherein said feedstock is a mineral oil fraction containing less than about 10 ppm of native organic nitrogen.

11. A process as defined in claim 8 wherein step (2) is carried out by vapor phase hydration of said catalyst to about 5–40 wt.% of adsorbed water, said adsorbed water containing about 10–35 wt.% of dissolved NH$_3$.

12. A process as defined in claim 8 wherein step (2) is carried out by contacting said catalyst with at least sufficient of an aqueous ammonium hydroxide solution containing about 0.1–30 wt.% of NH$_3$ to submerge the catalyst bed.

13. A process as defined in claim 8 wherein, following step (1) and prior to step (3), said catalyst is subjected to ion exchange by contact with an aqueous ammonium salt solution to remove zeolitic metal cations therefrom.

14. A process as defined in claim 8 wherein said Y zeolite cracking base is stabilized with about 1–10 wt.% of zeolitic polyvalent metal ions.

* * * * *